April 12, 1932. P. OBUCHOWSKI 1,853,573
AUTOMOBILE SPLASH GUARD
Filed Dec. 31, 1929
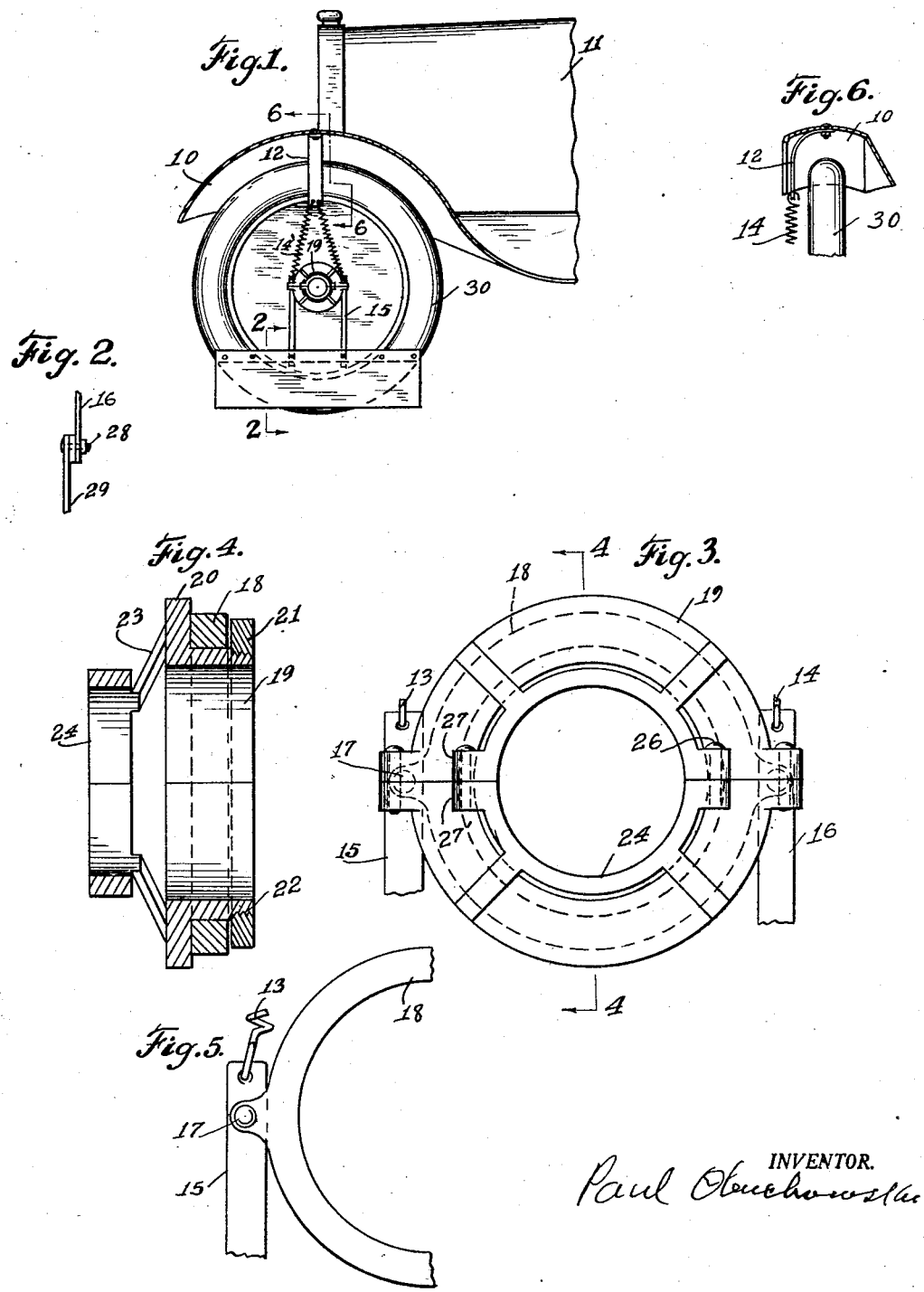
INVENTOR.
Paul Obuchowski Patented Apr. 12, 1932

1,853,573

UNITED STATES PATENT OFFICE

PAUL OBUCHOWSKI, OF STAMFORD, CONNECTICUT

AUTOMOBILE SPLASH GUARD

Application filed December 31, 1929. Serial No. 417,709.

This invention relates to a splash guard for vehicle wheels, particularly for automobiles, and it is the principal object of my invention to provide a splash guard for protecting pedestrians and other vehicles against the mud, etc., thrown laterally from the wheels during the rapid travel of the automobile.

Rapidly traveling automobiles in rainy weather throw the slush and watery mud laterally against pedestrians and other passing vehicles much to the inconvenience and injury of pedestrians.

My invention overcomes this disadvantage by the suspension of a yielding splash guard preventing the mud, etc., to be spread or thrown laterally to the path of the vehicle, and it is another object of my invention to suspend the splash guard in such a manner from the vehicle's axle that it will adapt itself to all oscillations of the car.

A further object of my invention is the provision of a splash-guard which is suspended from a part of the vehicle, for instance the mud-guard of an automobile to yieldingly avoid all damage to the guard by meeting obstructions in the path of the car.

A still further object of my invention is the provision of a splash-guard for automobiles of simple and inexpensive construction, yet durable and efficient in operation.

These and other objects and advantages of my invention will become more fully apparent as the description thereof proceeds, and will then be specifically defined in the appended claim.

In the accompanying drawings forming a material part of this disclosure:

Fig. 1 is a fragmentary side elevation of an automobile radiator and mud-guard illustrating the attachment of the splash-guard constructed according to my invention.

Fig. 2 is a section on line 2—2 of Figure 1.

Fig. 3 is an elevation of the central boss or bushing on an enlarged scale.

Fig. 4 is a section through the same on line 4—4 of Figure 3.

Fig. 5 is a fragmentary detail view of a movable carrier ring for the side links.

Fig. 6 is a fragmentary sectional rear elevation of wheel and upper end of splash-guard securing means, the section being taken on line 6—6 of Figure 1.

As illustrated, an automobile mud-guard 10 on radiator 11 has suspended from its lower face the upper end of a strap 12, the lower end of which is perforated. In the perforations the upper ends of springs 13, 14, are secured, the lower ends of which are attached to members or links 15, 16 having pivotally attached thereto, as at 17, a ring member 18 rotatably held in a groove of a boss or bushing, generally designated 19 and formed by a flange 20 of the boss and a cap 21 secured upon a flange 22 of the boss. The rear face of the boss has attached thereto by means of inclined bars 23 a bi-partite sleeve 24 adapted to be clamped upon the axle 25 of the car by means of bolts 26 passing through the pairwise arranged sockets 27, 27′, of the sleeve parts. To the lower ends of links 15, 16 is detachably secured by means of screws 28 the splash guard 29.

The operation of my device will be entirely clear from the above description on hand of the drawings, and it will be entirely clear that the boss can be clamped by means of its bi-partite sleeve to the axle of the automobile, while the strap 12 is attached to the lower face of the mudguard and the springs hooked with their upper ends into the perforations of the strap and with their lower ends connected to the upper ends of links 15, 16 carrying on the outer lower side face of the wheel 30 the splash-guard 29, so that pedestrians and other vehicles are protected from the mud laterally splashed by the quickly rotating auto wheels, while the splash guard owing to its resilient and movable mounting and the rotation of ring 18 about the boss will readily accommodate itself to any oscillations caused by uneven roads, and swaying of the vehicle and to pass over obstacles on the road.

It will be understood that I have disclosed the preferred form of my device only and that I may make such changes in its construction as come within the scope of the appended claim without departure from my invention.

Having thus described my invention, what

I claim as new and desire to secure by Letters Patent is:

A splash-guard for the wheels of motor vehicles comprising a member clamped to the wheel axle, a ring rotatably held in said member, links pivotally secured intermediate their ends to said ring and attached at their lower ends to said splash-guard, springs attached at their ends to said links, a strap to which the opposite ends of said springs are attached, and means for suspending said strap from the inner face of the vehicle's mudguard.

Signed at New York, in the county of New York and State of New York, this 13th day of December, A. D. 1929.

PAUL OBUCHOWSKI.